(12) United States Patent
Tickle (10) Patent No.: US 11,598,879 B2
(45) Date of Patent: Mar. 7, 2023

(54) OYSTER REEF RESTORATION TILE

(71) Applicant: GROW Oyster Reefs, Charlottesville, VA (US)

(72) Inventor: Evelyn Tickle, Charlottesville, VA (US)

(73) Assignee: GROW Oyster Reefs, Charlottesville, VA (US)

( * ) Notice: Subject to any disclaimer, the term of this patent is extended or adjusted under 35 U.S.C. 154(b) by 439 days.

(21) Appl. No.: 16/355,820

(22) Filed: Mar. 17, 2019

(65) Prior Publication Data

US 2019/0212455 A1  Jul. 11, 2019

Related U.S. Application Data

(63) Continuation of application No. 15/131,901, filed on Apr. 18, 2016.
(Continued)

(51) Int. Cl.
*A01K 61/70* (2017.01)
*G01S 19/13* (2010.01)
(Continued)

(52) U.S. Cl.
CPC .............. *G01S 19/13* (2013.01); *A01K 61/54* (2017.01); *A01K 61/70* (2017.01); *C04B 28/02* (2013.01);
(Continued)

(58) Field of Classification Search
CPC ........ A01K 61/70; A01K 61/77; A01K 61/78; A01K 61/54
See application file for complete search history.

(56) References Cited

U.S. PATENT DOCUMENTS

| 4,508,057 A | * | 4/1985 | Suzuki | ................... C12N 1/12 119/221 |
| 4,997,311 A | * | 3/1991 | Van Doren | ............. E02B 3/046 405/30 |

(Continued)

FOREIGN PATENT DOCUMENTS

| CA | 2169207 A1 | * | 8/1997 | ........... B28B 7/0082 |
| CA | 2978252 A1 | * | 9/2016 | ............. A01K 61/70 |

(Continued)

OTHER PUBLICATIONS

Allied Concrete Co., "Oyster Castle" available at http://alliedconcrete.com/materials/oyster-castles/ (obtained Jun. 24, 2019) (Subject matter: concrete units for oyster growth).
(Continued)

*Primary Examiner* — Monica L Perry
*Assistant Examiner* — Aaron M Rodziwicz
(74) *Attorney, Agent, or Firm* — Mintz Levin Cohn Ferris Glovsky and Popeo, P.C.

(57) ABSTRACT

A concrete marine habitat substrate tile that is portable for a human and which provides an increased calcium carbonate content and interstitial spaces for feeding and providing a habitat for developing oysters is described. Specifically provided is a reef restoration and oyster growing tile comprising: a concrete tile comprising at least 25% by weight calcium carbonate; wherein the concrete tile comprises a base and a surface disposed on the base and comprising a plurality of spaced projections and interstitial spaces; and wherein the plurality of spaced projections and interstitial spaces provide a 3-dimensional surface.

20 Claims, 6 Drawing Sheets

Related U.S. Application Data (60) Provisional application No. 62/149,544, filed on Apr. 18, 2015.

(51) Int. Cl.
*A01K 61/54* (2017.01)
*C04B 28/02* (2006.01)
*C04B 111/00* (2006.01)

(52) U.S. Cl.
CPC ..... *C04B 2111/00758* (2013.01); *Y02A 40/81* (2018.01); *Y02W 30/91* (2015.05)

(56) References Cited

U.S. PATENT DOCUMENTS

| | | | | |
|---|---|---|---|---|
| 5,215,406 A | * | 6/1993 | Hudson | E02B 3/046 |
| | | | | 405/25 |
| 5,259,695 A | * | 11/1993 | Mostkoff | A01K 61/70 |
| | | | | 405/29 |
| 5,275,125 A | * | 1/1994 | Rotramel | A01K 67/033 |
| | | | | 119/416 |
| 5,564,369 A | * | 10/1996 | Barber | A01K 63/006 |
| | | | | 119/221 |
| 5,836,265 A | * | 11/1998 | Barber | B28B 7/32 |
| | | | | 119/221 |
| 6,293,065 B1 | * | 9/2001 | Suzuki | B28B 7/346 |
| | | | | 52/315 |
| 6,464,429 B2 | * | 10/2002 | Moore | E02B 3/046 |
| | | | | 405/24 |
| 6,491,473 B2 | | 12/2002 | Veazey | |
| 6,581,349 B1 | * | 6/2003 | Riley | A47K 3/28 |
| | | | | 4/494 |
| 6,659,686 B2 | | 12/2003 | Veazey | |
| 6,962,130 B1 | * | 11/2005 | Kennedy | A01K 61/70 |
| | | | | 119/221 |
| D566,001 S | * | 4/2008 | Buchenroth, III | D11/157 |
| 7,373,892 B2 | | 5/2008 | Veazey | |
| 7,513,711 B1 | * | 4/2009 | Walter | A01K 61/70 |
| 7,603,959 B1 | | 10/2009 | Veazey | |
| 7,762,205 B1 | | 7/2010 | Veazey | |
| 7,827,937 B1 | * | 11/2010 | Walter | E02B 3/046 |
| | | | | 119/221 |
| 7,992,509 B1 | | 8/2011 | Veazey | |
| 9,403,287 B2 | * | 8/2016 | Hilton | B28B 7/18 |
| 2005/0238431 A1 | * | 10/2005 | Buchenroth | B29C 33/3857 |
| | | | | 405/25 |
| 2011/0250017 A1 | * | 10/2011 | Sung | A01K 61/70 |
| | | | | 405/25 |
| 2015/0239149 A1 | * | 8/2015 | Cavanagh | B28B 7/007 |
| | | | | 428/542.2 |
| 2016/0044899 A1 | * | 2/2016 | Bartkowski | E02B 3/046 |
| | | | | 405/31 |
| 2017/0028585 A1 | * | 2/2017 | Hilton | B28B 23/00 |
| 2018/0049410 A1 | * | 2/2018 | Lindquist | A01K 61/54 |
| 2018/0066408 A1 | * | 3/2018 | Hilton | B28B 7/0029 |
| 2020/0146267 A1 | * | 5/2020 | Abdulrahman | A01K 61/77 |
| 2020/0367477 A1 | * | 11/2020 | Schofield | B29C 64/165 |

FOREIGN PATENT DOCUMENTS

| | | | | |
|---|---|---|---|---|
| DE | 102010049049 B3 | * | 3/2012 | ............ A01K 61/70 |
| GB | 2569716 A | * | 6/2019 | ............ A01K 61/73 |
| JP | H05132349 | ‡ | 3/1996 | |
| WO | WO-9729629 A1 | * | 8/1997 | ......... A01K 63/006 |
| WO | WO-2010104342 A2 | * | 9/2010 | ............ E02B 3/08 |
| WO | WO-2010131246 A1 | * | 11/2010 | ............ E02B 3/04 |
| WO | WO-2011086744 A1 | * | 7/2011 | ............ C04B 24/14 |
| WO | WO-2017081495 A1 | * | 5/2017 | ............ A01K 61/77 |

OTHER PUBLICATIONS

Econcrete, "Marine mattresses" available at https://econcretetech.com/ (obtained Jun. 24, 2019) (Subject matter: concrete products for ecosystems).

Ready Reef Inc., "Living Shoreline and Oyster Habitats for the Chesapeake Bay" available at http://www.readyreef.com/ (obtained Jun. 24, 2019) (Subject matter: oyster restoration).

The Reef Ball Foundaton, "Reef Ball Brochure & Key Features Page" available at http://www.reefball.org (obtained Jun. 24, 2019) (Subject matter: reef rehabilitation).

\* cited by examiner
‡ imported from a related application

OYSTER REEF RESTORATION TILE

CROSS-REFERENCE TO RELATED APPLICATION

This application is a Continuing Application of U.S. patent application Ser. No. 15/131,901, filed on Apr. 18, 2016, which claims priority to U.S. Provisional Application No. 62/149,544, filed on Apr. 18, 2015.

BACKGROUND OF THE INVENTION

Field of the Invention

The present invention relates to the field of oyster reef restoration, marine habitat and oyster related fisheries. More particularly, the present invention relates to a portable concrete reef substrate tile comprising calcium carbonate and interstitial spaces for feeding and providing a habitat for developing oysters. Additionally, the present invention relates to a concrete formulation that is pourable, sprayable, able to coat surfaces, or otherwise moldable, which may be structural or non-structural, and can be used to aid oyster and other marine habitat and growth.

Description of Related Art

Attempts have been made to replace the loss of natural oyster reefs. There are two types of present technologies and two types of Ad-hoc Variations of Oyster Reef Starters using Shell and Shell-less. The first is artificial reefs containing oyster shells such as READYREEF®. The second is large concrete structures. These large concrete structures require a contractor and a crane to install and do harm to the shoreline and sandy bottom during installation. Examples include products such as OYSTERBREAK® (U.S. patents and published applications include, U.S. Pat. Nos. 7,992,509, 7,762,205, 7,603,959, 6,659,686, US20020104469A1, and US20070283866A1) units made of OYSTERKRETE® and OYSTER CASTLES®.

There are additional concrete forms of varying shape and weights, but they are susceptible to displacement in high-energy wave areas. Additionally, other large structures could impede water traffic. These structures are designed as solutions for stacking the products in the water bodies for issues of strength and have large amounts of consistent and smooth concrete surface. These large scaled solutions, due to large scale equipment needed to install, do not allow individuals, homeowners, or community groups to install a small or long length artificial reef in a natural water body or in a tank. OYSTER CASTLES® claims to have a proprietary concrete formula.

Although there are shell-recycling programs for many areas, there is a scarcity of oyster shells for reef replacement. Some solutions involve piling up stacks of native oyster shell, which silt quickly covers. Placing these shells in bags is a common solution and a way to overcome losing the shell, but the bags must be permanently attached in some way and do not allow for a diverse bioculture. These solutions still do not address the problem of not having enough oyster shell available for conservation needs. The products using native shell, such as READYREEF® require many hours of hand labor to produce one product involving drilling the individual shells and attaching them together in a strong enough manner to withstand tides and storms; they are also not heavy enough to hold themselves down without a rigging system.

Various Shell-less Ad-Hoc Reefs include concrete blocks and heavy discarded household items, such as toilets. One way to overcome the loss of natural reefs is to establish new artificial reefs. Artificial reefs are used in commercial oyster operations and by national, state, and local governments for shoreline protection and wave mitigation. Artificial reefs can jump-start the restoration of estuarine ecosystems and are the subject of intense research efforts. They provide educational opportunities for students across grade levels and allow for increased personal connections to these ecosystems. However, there are some difficulties encountered with existing artificial reefs. Plastics commonly used in these artificial reefs can break down in the corrosive marine environment, releasing toxins and adding to the trash level in the waters. Discarded tires that are used to initiate reefs can become dislodged and add to ocean pollution, as well as add toxins to the water. The tires expose the oysters to toxins absorbed through the shell during attachment and into the interior of the oyster as it opens and closes while filtering water.

Thus, as is apparent from the foregoing background, there exist numerous limitations in the art of oyster reef restoration which provide a need for improvements.

SUMMARY OF THE INVENTION

In embodiments, the present invention is a concrete reef substrate tile comprising a specially-formulated concrete with a decreased cement and aggregate content and increased content of calcium carbonate (naturally occurring in oyster shells) which is used to "feed" developing embryonic oysters (called "spat") attached to its surface. One face of the substrate tile comprises three-dimensional extrusions that provide interstitial still spaces for the spat to attach to the reef as occurs in the wild in a natural oyster reef. In addition, the opposite face of the tile is irregularly-shaped for planting into the sandy or silty bottom of a body of water. In embodiments, the substrate tile is provided in a portable size, e.g., a size capable of being carried by a human, which may be stacked or interlocked as a mat.

In another embodiment, the present invention is a unique concrete formulation, which may be strong enough, such as through addition of sufficient aggregate, to provide structural support. The formulation may be pourable, sprayable, able to coat surfaces, or otherwise moldable.

BRIEF DESCRIPTION OF THE DRAWINGS

The accompanying drawings illustrate certain aspects of embodiments of the present invention, and should not be used to limit the invention. Together with the written description the drawings serve to explain certain principles of the invention.

DETAILED DESCRIPTION OF VARIOUS EMBODIMENTS OF THE INVENTION

Reference will now be made in detail to various exemplary embodiments of the invention. It is to be understood that the following discussion of exemplary embodiments is not intended as a limitation on the invention. Rather, the following discussion is provided to give the reader a more detailed understanding of certain aspects and features of the invention.

In embodiments, the present invention is a concrete reef substrate tile designed to facilitate the adherence and growth of oysters in a body of water or tank. The concrete tile comprises up to 85% calcium carbonate to provide calcium to maturing oyster shells. In addition, one face of the concrete tile comprises three-dimensional extrusions or projections which provide interstitial spaces for the protection and growth of juvenile oysters and the protection of other marine organisms. The three-dimensional extrusions or projections may also facilitate stacking of the tiles upon one another in a vertical orientation, or hanging or adhering the tiles in an orientation where the projections creating the interstitial spaces are in any position of 360 degree rotation. The opposite face can be irregularly-shaped for attachment to the sandy or rocky bottom of the shoreline, or flat, and can have one or more holes through the thickened base. In embodiments, the concrete reef substrate tile weighs about 1 to 100 lbs., which is light enough to be portable by a human, but heavy enough to remain stationary in moving water.

Researchers often use concrete blocks as reefs because standard concrete has a tertiary amount of calcium carbonate as an ingredient; natural oyster shell is 95% calcium carbonate. Many concrete oyster reefs are blocks or modified cylinders that are too large in scale to be manipulated by a single person. Further, they do not provide the interstitial spaces that juvenile oysters among other small organisms and up to 150 species of young fish would require for protection in an oyster reef. There is no artificial oyster reef available that so closely resembles a natural reef. According to the present invention, oysters would have more calcium to incorporate into their shells thus making the shells stronger and able to last longer. The formulations of the invention would also make conditions in artificial reefs more like those that occur in natural reefs, for example, by fostering more embryonic oysters, spat; and by increasing the spat attachment attraction to the artificial reef; and by increasing the health and life cycle of the oyster; and by making scientific research more exact.

In embodiments, the tile of the invention is provided in a size that can be lifted by a human, including children. The total size of the concrete tile may provide a weight that is in the range of 2 to 100 lbs., such as from 8 to 20 lbs., 5 to 25 lbs., 5 to 30 lbs., 10 to 30 lbs., 5 to 40 lbs., 10 to 40 lbs., 5 to 50 lbs., 10 to 50 lbs., 6 to 28 lbs., 7 to 34 lbs., 4 to 16 lbs., 3 to 13 lbs., 3 to 30 lbs., 4 to 28 lbs., 7 to 41 lbs., 11 to 53 lbs., 4 to 35 lbs., 15 to 75 lbs., 12 to 28 lbs., 8 to 58 lbs., and the like. The tiles can be fabricated in any desirable weight for a particular application, including from 2-100 lbs., or 5-90 lbs., or 10-80 lbs., or 15-70 lbs., or 20-60 lbs., or 30-50 lbs., or 25-40 lbs.

In an exemplary embodiment, the dimensions of the tile are 12" length×12" width×2" thickness. In another exemplary embodiment, the dimensions of the tile are 12" length× 12" width×3" thickness. However, the tile may take on other dimensions, including 11"×11"×3", 10"×10"×2", 10"×10"× 3", 8"×8"×1", 8"×8"×2", 9"×9"×2", 11"×11"×2", 12"×12"× 2", 12"×12"×3", 14"×14"×3", 13"×13"×3", 10"×10"×4", 11"×11"×4", 14"×14"×4", 15"×15"×3", 15"×15"×5", 15"× 15"×4", 16"×16"×6", 18"×18"×8", and the like. In embodiments, the length/thickness or width/thickness ratio may be in the range of 10:1 to 2:1. Further, rectangular dimensions are also possible, including 12"×10"×3", 12"×14"×3", 12"× 11"×2", 10"×11"×3", 10"×11"×2", 10"×11"×4", 12"×13"× 2", 10"×8"×2", 12"×8"×2", 10"×9"×2", 10"×9"×1", 12"× 11"×4", 15"×10"×2", 15"×11"×3", 13"×12"×3", 15"×14"× 2", 15"×14"×3", 15"×13"×2", 15"×13"×3", 16"×10"×3", and the like. Indeed, in preferred embodiments, any one or more of the length, width, and/or thickness of the tile can be in the range of 1 inch to 24 inches, such as from 2-20 inches, or from 5-15 inches, or from 3-12 inches, or from 4-10 inches, or from 6-18 inches, or from 8-25 inches and so on. Additionally, the tile may take on other polygonal shapes in addition to a square or a rectangular shape, including trapezoidal, triangular, pentagonal, hexagonal, as well as non-polygonal shapes, such as oval, circular, or ellipsoid.

Figure 3:
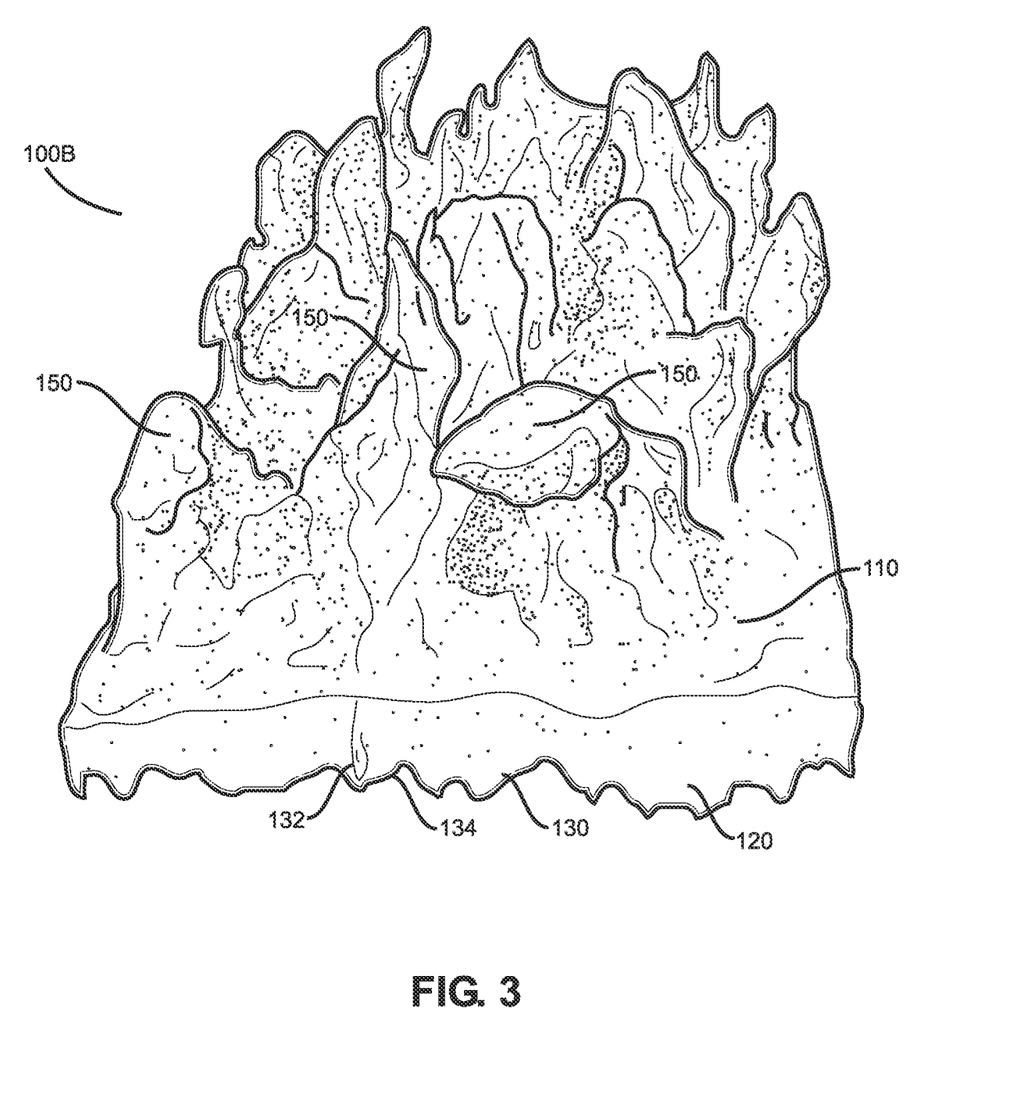
FIG. 3 is a drawing showing an embodiment of a concrete reef substrate tile of the invention.
Figure 4:
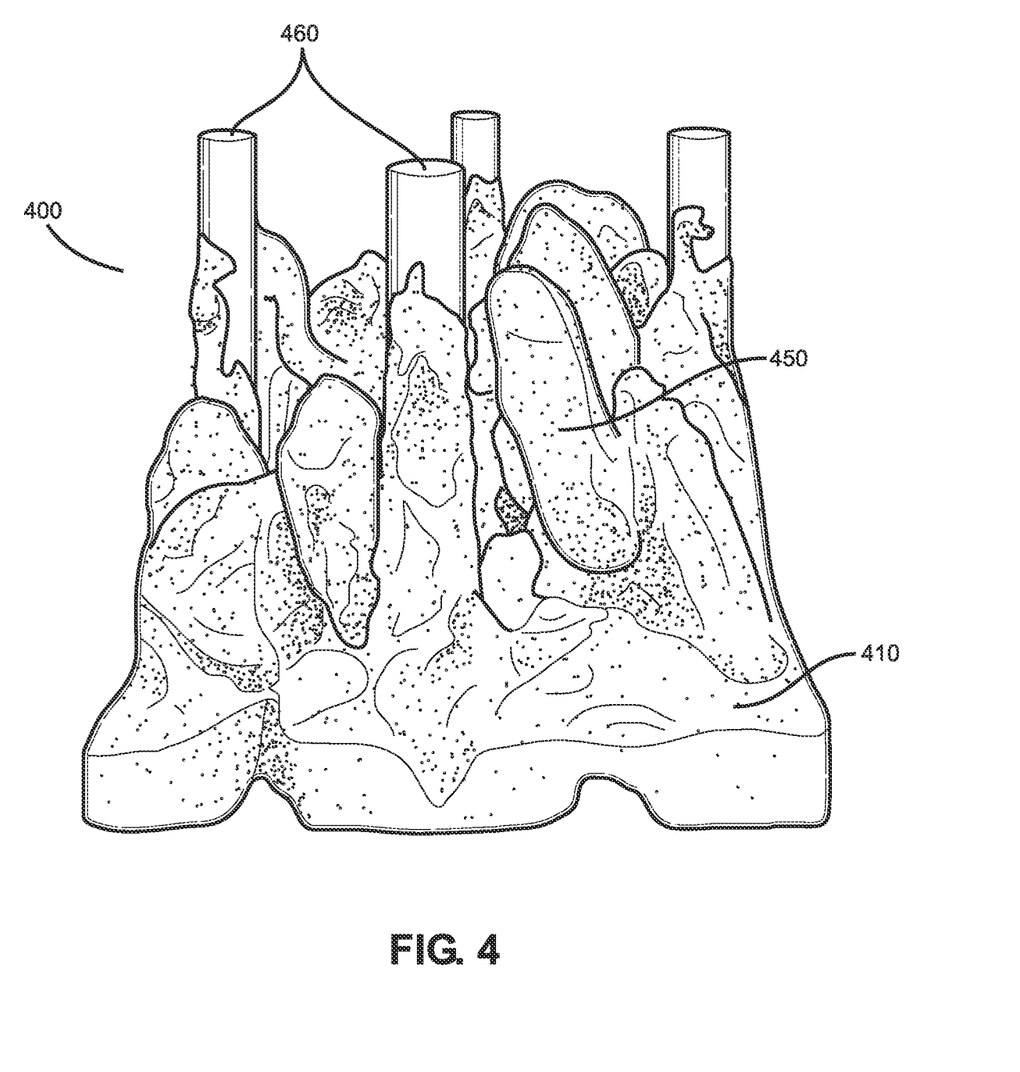
FIG. 4 is a drawing showing an embodiment of a concrete reef substrate tile of the invention.

Existing concrete oyster reefs do not provide the interstitial spaces that juvenile oysters among other small organisms would require for protection in an oyster reef. There is no artificial oyster reef available that so closely resembles a natural reef. In contrast, embodiments of the invention replicate the shape and patterning of an oyster reef in the tile. An infinite number of arrangements are possible and any number of variations of individual oyster shell arrangements on tiles can be used. The variation within each tile and within each set may provide a non-uniform environment that replicates a natural oyster reef. In one embodiment, the extrusions on one face of the tile are irregularly shaped, and designed to replicate the shape of mature oyster shells. In another embodiment, the extrusions on one face of the tile are designed to facilitate stacking of the tiles (e.g., those shown in FIG. 4), such as by columns that can be used to support stacking of the tiles in the vertical direction. Each tile may have anywhere from 1 to 2,000 projections that are regularly or irregularly spaced apart at intervals ranging from 0.1 inch to 24 inches, which projections and spacing together provide for the interstitial spaces. In embodiments, the extrusions or projections extend outward from the tile anywhere from 1× to 10× the thickness of the base of the tile (the section of the tile on which the projections are disposed), and may each be the same or of different heights than the other extrusions or projections. Further, in embodiments, the extrusions may be stacked one on top of each other. The end result is that the extrusions or projections on the face of the tile provide for an irregularly-shaped surface with projections and interstitial spaces that replicate the shape and patterning of an oyster reef. As shown in FIGS. 3 and 4, by way of example, the projections do not have to conform to any particular shape or size, including the ability to deviate from the natural oyster shape and known size. The projections can alternatively or in addition have the form of any other shellfish as well.

Figure 6:
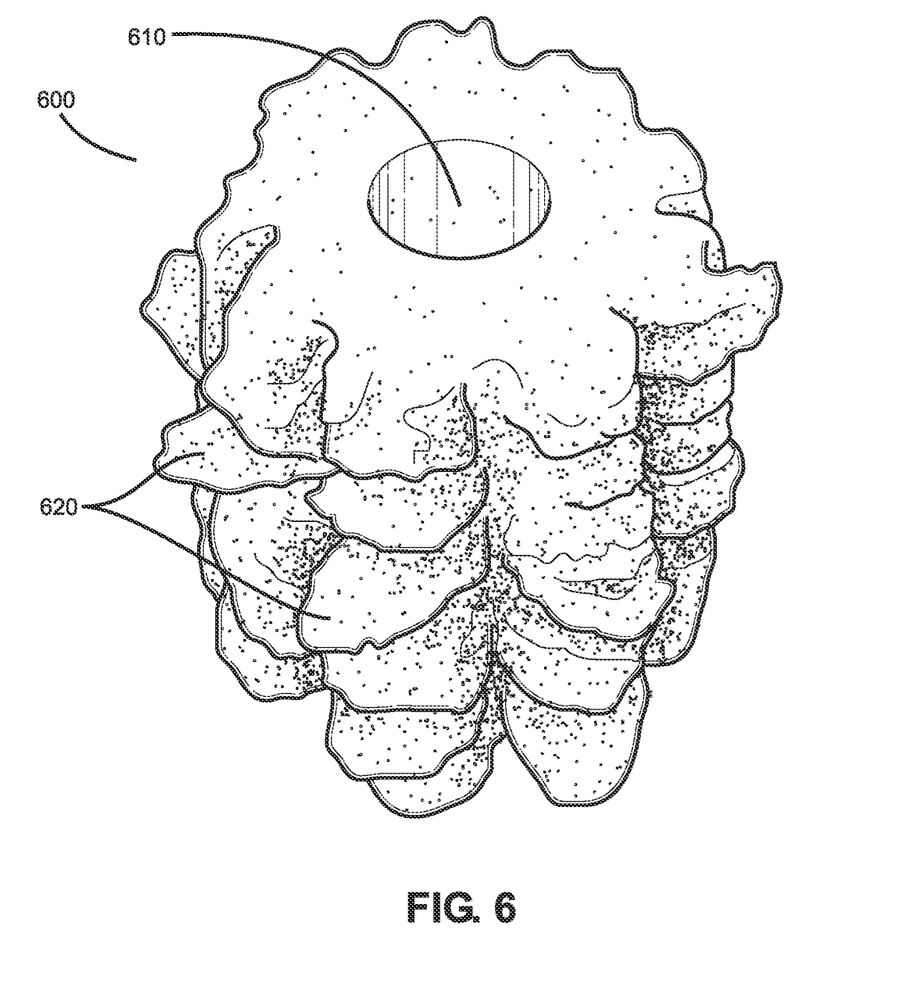
FIG. 6 is a drawing showing an embodiment of a concrete reef substrate of the invention in a disc-like form.

Further, in embodiments, the opposite face of the substrate tile may be irregularly shaped to provide ridges and grooves for holding the tile in sand or silt at the bottom of the estuary or stream. In embodiments, the ridges and grooves on the bottom face of the tile represent 1% to 50% of the thickness of the tile. In embodiments, the bottom face of the tile has extrusions or projections extending outward 1× to 10× the thickness of the tile to provide an anchor for fixing the tile to the bottom floor of a body of water. Further, other embodiments may have extrusions or projections projecting from or overhanging the sides of the tile and holes within the base of the tile to facilitate securing the tiles or providing a place for silt settlement. Additionally, other embodiments include singleton oysters, which tiles for example can be made of a small 4" tile base and a small amount of protrusions or singletons. Elongated tiles, for example, up to about 6 inches in length are also possible. Such smaller and longer embodiments may be placed between Shore Break boulders, turning these existing reefs into oyster reefs. By way of example, such tiles may be shaped like elongated or rounded discs. Additionally, in embodiments, the tile may include a hole for attachment purposes, as a means of secondary securing or accessing the tile; for example, securing the tile to a rope or a pipe (or other extension). As shown in FIG. 6, in preferred embodiments, the disc is configured in the shape of a tire or wheel. For example, the disc can comprise a hole passing completely or partially through the disc, which may or may not be centrally located within the disc. In preferred embodiments, the disc can comprise two surfaces that oppose one another and a third surface extending between the two opposed surfaces which third surface extends substantially annularly around the two opposing surfaces. As shown in FIG. 6, around the outside circumference of the disc in a preferred embodiment, extrusions, projections, and spaces may provide for a non-uniform environment that replicates the shape and patterning of a natural oyster reef.

In embodiments, the invention may comprise a set of substrate tiles comprising a plurality of tiles produced with the same pattern of extrusions or projections, or with a different pattern of extrusions or projections. In one embodiment, the invention comprises a set of substrate tiles comprising a plurality of tiles representing a plurality of different variations of individual oyster shell arrangements, such as for example 4, 5, 6, 7, 8, 9, 10, 11, 12, 13, 14, 15, 16, 17, 18, 19, 20 or more different variations. When used together as a reef restoration system, the variation within each tile and within each set of multiple tiles may provide a non-uniform environment that replicates the shape and patterning of a natural oyster reef. An embodiment of the invention is a set of substrate tiles packaged together comprising 10 or more individual tiles, comprising anywhere from 1 to 20 unique patterns of extrusions or projections.

In embodiments, the invention may include a miniature electronic transmitter tracking device or locating transducer, such as a tracking device using radio frequency, electromagnetism, and/or global positioning satellite technology. For example, the transmitter may be embedded in the tile or affixed to the tile. In a preferred embodiment, the transmitter will be paired with a receiver that can track the tile in case it is lost or stolen. The device may contain microcircuitry, which would comprise the transmitter, a way to propagate a signal (e.g., an antenna), and a power supply (e.g., a battery). The transmitter may remain passive until remotely activated or maintain continuous operation. The tracking device may also comprise a non-transitory computer readable storage medium, such as a memory.

Preferred embodiments of the invention provide up to 80% calcium carbonate in the concrete formulation. However, other embodiments may comprise calcium carbonate in the range of 10% to 80%, 20% to 80%, 30% to 80%, 40% to 80%, 50% to 80%, 60% to 80%, 70% to 80%, 75% to 80%, 10% to 85%, 20% to 85%, 30% to 85%, 40% to 85%, 50% to 85%, 55% to 85%, 60% to 85%, 65% to 85%, 70% to 85%, 75% to 85%, 80% to 85%, 10% to 90%, 20% to 90%, 30% to 90%, 40% to 90%, 50% to 90%, 60% to 90%, 70% to 90%, 75% to 90%, 80% to 90%, and 85% to 99% in the concrete formulation. The percentage of calcium carbonate in the tile can be measured in the concrete used to form the tile or in the finished tile itself. Preferably, the content of calcium carbonate or other calcium compound is calculated based on weight of the compound. Embodiments may use calcium or other calcium-containing compounds, alternatively or in addition to calcium carbonate, such calcium citrate, calcium chloride, calcium gluconate, calcium hydroxide, calcium oxalate, calcium sulfate, and/or calcium phosphate. In embodiments, the concrete formulation may include one part conventional cement up to 10 parts calcium or a calcium-containing compound, such as 1 part to 8 parts, or 1 part to 6 parts, or 1 part to 5 parts. In preferred embodiments, the concrete formulation may include one part cement, to four parts calcium carbonate ($CaCO_3$) in marble, limestone, or eggshell dust. In embodiments, the formulation can comprise any conventional concrete formula with or without added calcium or calcium-containing compound(s), especially when incorporating natural oyster shells into the formed tile. In other embodiments, the formulation may comprise conventional concrete and added calcium or calcium-containing compound(s), as well as aggregate to strengthen the concrete to, for example, make the composition sufficiently strong for structural purposes.

Figure 1A:
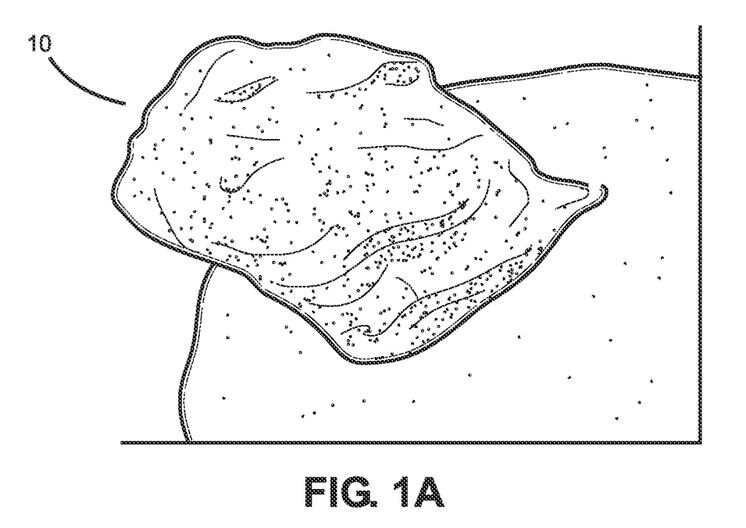
FIGS. 1A and 1B show an embodiment of the invention in the form of a singleton oyster shell.
Figure 1B:
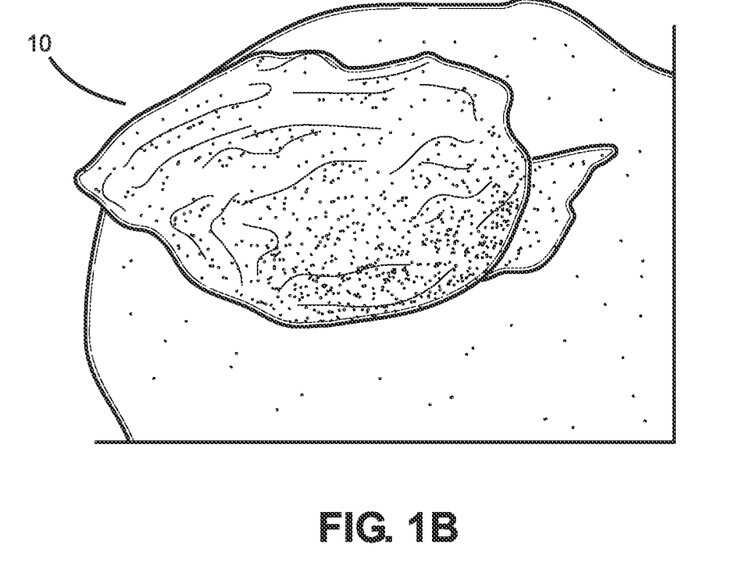
Figure 2:
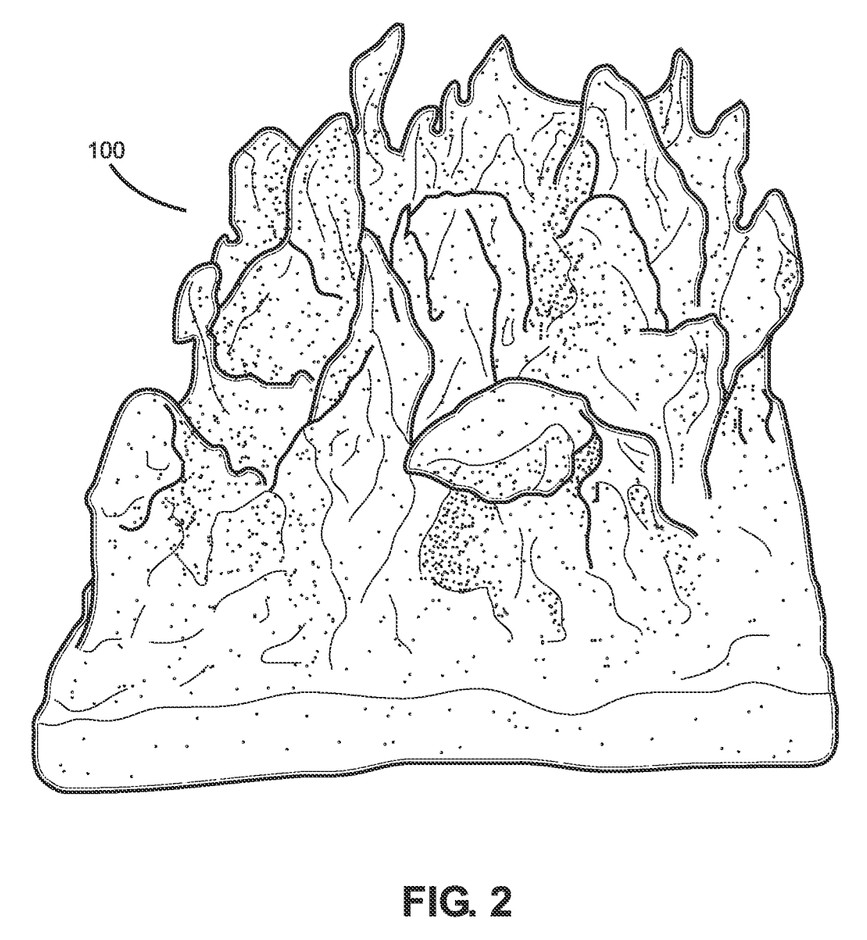
FIG. 2 is a drawing showing an embodiment of a concrete reef substrate tile of the invention.

Turning now to the figures, FIGS. 1A and 1B show close-ups of a tile embodiment with a replica of a singleton oyster shell 10. FIG. 2 shows an embodiment of a 3-dimensional reef tile 100. FIG. 3 is a photograph showing an embodiment of concrete reef substrate tile 100B. The photograph shows top face 110 of the substrate tile 100 with oyster-shell shaped extrusions or projections 150. Additionally, the photograph of FIG. 3 shows the thickness of the tile base 120 and shows the irregular pattern of the bottom face 130 with ridges 132 and grooves 134. As shown in FIG. 3, the 3-D projections on the face of the tile increase the surface area of the tile. For a tile with a 10 inch×10 inch base, if the tile had a flat face the surface area would be in the range of about 100 $in^2$. By adding multiple projections to the face of the tile, the surface area of the 3-D face can be 2×, 5×, 10×, 20×, 50×, 100×, 200×, 300×, 400×, 500×, 600×, 700×, 800×, 900×, 1,000×, 1,500×, 2,000×, 5,000×, or even 10,000× that of the area of the base of the tile. The surface area is created by a particular combination of projections and spacing of the projections on the tile. In preferred embodiments, the surface area of the 3-D face of the tile is in the range of about 2× to 100× the area of the base. Computer tomography can be used to quantify the surface area of the 3-D face, as well as a 3-D laser scanner, such as the NextEngine brand laser scanner.

Figure 5:
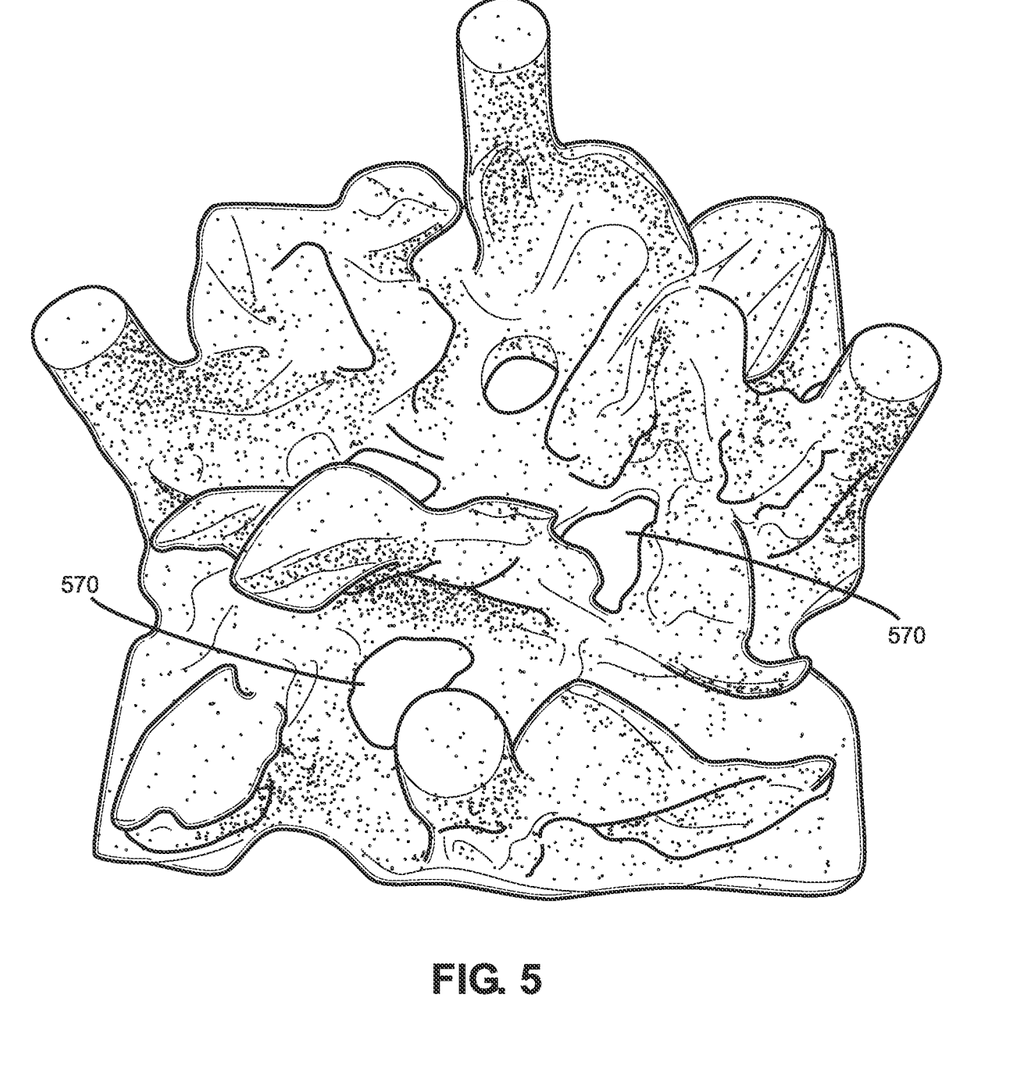
FIG. 5 is a drawing showing an embodiment of a concrete reef substrate tile of the invention.

FIG. 4 shows another embodiment of a 3-dimensional reef tile 400. The photograph shows top face 410 of the substrate tile 400 with extrusions or projections 450. Columnar projections 460 may be used to support the stacking of reef tiles on top of each other in the vertical direction. FIG. 5 shows the embodiment of FIG. 4 as pictured from the top of the substrate tile, exemplifying holes 570 within the base of the tile to facilitate securing the tiles or providing a place for silt settlement.

FIG. 6 shows another embodiment of a 3-dimensional reef tile structure 600. FIG. 6 shows the disc can comprise a hole 610 passing completely or partially through the disc. It shows a surface extending annularly around the disc having projections 620 for a non-uniform environment that replicates the shape and patterning of a natural oyster reef.

A minimum number of shells are used to generate a "reef" structure and create a mold into which the concrete can be poured. The mold may be made by hand or drawn in a CAD program and 3-D Printed or fabricated using other digital fabrication techniques. The natural shells used to make molds may be arranged in individual shell and multiple shell layouts that provide for a thriving and sustainable reef. Natural oyster shells can be incorporated into the concrete tile in addition to or in place of concrete replicas of the shells. An additional embodiment of the invention comprises a mold configured to produce the tiles from poured concrete. Alternatively, oyster shells can be 3-D scanned, 3-D printed, and cemented to the tiles. Forming of the concrete tile can be performed using digital fabrication techniques and/or robotic technology.

The substrate tiles may be used in bays, streams, oceans, and rivers or other water bodies, including tanks, to provide a more natural artificial substrate for successful embryonic oysters to attach to during spawning. The tiles may provide for healthier edible oysters and longer living oysters due to the reduction in toxins found in normal concrete, which are frequently used in many artificial reefs. The addition of calcium carbonate to the concrete formula of the present invention is to contribute to healthy, long-lasting oysters. The substrate tiles can be carried and placed into the water body, with little to no disruption to the existing ecosystem, by individuals in single tile count or in multitudes placed across miles of shoreline. The substrate tiles of the invention initiate the growth of new oyster reefs and replace the multitudes of previously existing reefs that have been lost over time. Benefits beyond increasing a healthy oyster population include stabilization of shoreline with the substrate tile and its developing oyster reef and the cleaning of the waters. The invention will grow the population of oysters, thus aiding the natural water cleaning processes that oysters provide. Other benefits of the invention include the ability to reduce toxins in runoff and the collection of excess sedimentation into estuarine areas, reduce pressure on aquaculture operations, aid educators in research through the singletons and light weight and portable products, benefit restoration and conservation research, and aid commercial oyster fisheries. The groups of people that will be impacted are governmental agencies, watermen, homeowners, citizens in communities around estuaries and bays, research scientists and teachers and students, oyster consumers and restaurateurs that serve oysters.

Additional improvements due to the invention are making the size of the reef starter smaller so that a single person can lift and place the reef starter, rather than using heavy machinery to install the reef starter, and having a product which more closely emulates a natural oyster reef substrate. These tiles could be used in place of any large reef starter, so government agencies could customize reef shape through the tile layout for particular areas and situations. The tiles allow for reefs to be installed where large reef starters could otherwise not be installed. This means that the number of reefs in an estuarine environment could be increased and help keep a species thriving in a localized area. The substrate tiles have been shown to attract a variety of plants and other animals, including other shell fish and fish, producing a healthy ecosystem in addition to the oyster. The size of the reef affects those doing research because it increases the potential sites for research as well as leveraging education into the research process via citizen science as a preteen to adult size person can carry a tile. Educational organizations and homeowners could install and maintain their own reefs using these tiles. Finally, business and homeowners would receive the benefits of having wave protection and runoff mitigation as the reefs grow and the additional benefit of having a "farm-to-table" opportunities. In contrast to existing reef starters, the invention achieves these benefits without impeding boat traffic or releasing harmful chemicals into the environment.

The present invention has been described with reference to particular embodiments having various features. In light of the disclosure provided above, it will be apparent to those skilled in the art that various modifications and variations can be made in the practice of the present invention without departing from the scope or spirit of the invention. One skilled in the art will recognize that the disclosed features may be used singularly, in any combination, or omitted based on the requirements and specifications of a given application or design. When an embodiment refers to "comprising" certain features, it is to be understood that the embodiments can alternatively "consist of" or "consist essentially of" any one or more of the features. Other embodiments of the invention will be apparent to those skilled in the art from consideration of the specification and practice of the invention.

It is noted in particular that where a range of values is provided in this specification, each value between the upper and lower limits of that range is also specifically disclosed. The upper and lower limits of these smaller ranges may independently be included or excluded in the range as well. The singular forms "a," "an," and "the" include plural referents unless the context clearly dictates otherwise. It is intended that the specification and examples be considered as exemplary in nature and that variations that do not depart from the essence of the invention fall within the scope of the invention. Further, all of the references cited in this disclosure are each individually incorporated by reference herein in their entireties and as such are intended to provide an efficient way of supplementing the enabling disclosure of this invention as well as provide background detailing the level of ordinary skill in the art.

The invention claimed is:

1. A portable concrete reef substrate tile, wherein the concrete reef substrate tile feeds developing embryonic oysters attached to the concrete reef substrate tile's surface, wherein the concrete reef substrate tile comprises vertical columnar extrusions or projections supported by buttresses and extending from one face of a base; wherein the vertical columnar extrusions or projections comprise crevices or cavities and are spaced to slow water flow and mitigate wave movement, create a marine habitat, provide for protection and upward growth of juvenile oysters and allow the oysters to form bridges between the columnar extrusions within the tile, from tile to tile, and from the tile to a sandy or silty bottom of a body of water to form a contiguous reef; and wherein the base has one opposite face that is irregularly shaped into ridges and grooves for attachment of the tile to a sandy or silty bottom of a body of water.

2. The portable concrete reef substrate tile of claim 1, wherein the ridges and grooves of the opposite face represent from about 1% to about 50% of the tile's thickness.

3. The portable concrete reef substrate tile of claim 2, wherein the concrete reef substrate tile has a weight between 2 and 100 lbs.

4. The portable concrete reef substrate tile of claim 3, wherein the concrete reef substrate tile has a weight between 8 and 20 lbs., or between 5 and 25 lbs., or between 5 and 30 lbs., or between 10 and 30 lbs., or between 5 and 40 lbs., or between 10 and 40 lbs., or between 5 and 50 lbs., or between 10 and 50 lbs., or between 6 and 28 lbs., or between 7 and 34 lbs., or between 4 and 16 lbs., or between 3 and 13 lbs., or between 3 and 30 lbs., or between 4 and 28 lbs., or between 7 and 41 lbs., or between 11 and 53 lbs., or between 4 and 35 lbs., or between 15 and 75 lbs., or between 12 and 28 lbs., or between 8 and 58 lbs.

5. The portable concrete reef substrate tile of claim 4, wherein the concrete reef substrate tile has a length from about 1 to about 24 inches; a width from about 1 to about 24 inches; and a thickness from about 1 to about 24 inches.

6. The portable concrete reef substrate tile of claim 5, wherein the portable concrete reef substrate tile comprises a tracking device embedded or affixed to the tile, and wherein the tracking device uses radio frequency, electromagnetism and/or global positioning satellite technology.

7. The portable concrete reef substrate tile of claim 6, wherein the tracking device comprises a microcircuit, a signal propagator and a power supply.

8. The portable concrete reef substrate tile of claim 7, wherein the face that comprises three-dimensional extrusions has a surface area 2 times, 5 times, 10 times, 20 times, 50 times, 100 times, 200 times, 300 times, 400 times, 500 times, 600 times, 700 times, 800 times, 900 times, 1,000 times, 1,500 times, 2,000 times, 5,000 times, or 10,000 times greater than the surface area of the opposite face.

9. The portable concrete reef substrate tile of claim 8, wherein the portable concrete reef substrate tile comprises from about 10% (w/w) to about 80% (w/w) calcium carbonate.

10. The portable concrete reef substrate tile of claim 9, wherein the portable concrete reef substrate tile further comprises cement and one or more calcium-containing compounds, and wherein the calcium-containing compounds are one or more of calcium citrate, calcium chloride, calcium gluconate, calcium hydroxide, calcium oxalate, calcium sulfate and calcium phosphate.

11. The portable concrete reef substrate tile of claim 10, wherein the portable concrete reef substrate tile comprises one part cement to up to 10 parts calcium carbonate.

12. The portable concrete reef substrate tile of claim 11, wherein the portable concrete reef substrate tile comprises one part cement to 8 parts calcium carbonate, or one part cement to 6 parts calcium carbonate, or one part cement to 5 parts calcium carbonate, or one part cement to 4 parts calcium carbonate.

13. A set comprising a plurality of portable concrete reef substrate tiles of claim 12, wherein each portable concrete reef substrate tile has a different pattern of extrusions or projections.

14. The set of claim 13, wherein each portable concrete reef substrate tile is shaped as elongated or rounded disc and comprises a hole, wherein each disc comprises two surfaces that oppose one another and a third surface extending between the two opposed surfaces, and wherein the third surface extends substantially annularly around the two opposing surfaces.

15. The portable concrete reef substrate tile of claim 1, wherein the portable concrete reef substrate tile comprises a composition comprising from about 10% (w/w) to about 80% (w/w) calcium carbonate, natural oyster shells, cement and one or more calcium-containing compounds, wherein the calcium-containing compounds are one or more of calcium citrate, calcium chloride, calcium gluconate, calcium hydroxide, calcium oxalate, calcium sulfate and calcium phosphate, and wherein the composition comprises one part cement to up to 10 parts calcium carbonate.

16. The portable concrete reef substrate tile of claim 15, wherein the composition comprises one part cement to 8 parts calcium carbonate, or one part cement to 6 parts calcium carbonate, or one part cement to 5 parts calcium carbonate, or one part cement to 4 parts calcium carbonate.

17. A method for stabilizing a shoreline, wherein the method comprises carrying to a water body the portable concrete reef substrate tile of claim 1; placing the portable concrete reef substrate tile in the water body, such that the portable concrete reef substrate tile initiates oyster reef growth; and generating an oyster reef in the water body, thereby stabilizing a shoreline.

18. The method of claim 17, wherein the body of water is a bay, a stream, an ocean, a river, or a tank.

19. The method of claim 18, wherein the portable concrete reef substrate tile has a weight between 2 and 100 lbs., a length from about 1 to about 24 inches; a width from about 1 to about 24 inches; and a thickness from about 1 to about 24 inches.

20. The method of claim 19, wherein the portable concrete reef substrate tile comprises a tracking device embedded or affixed to the tile, and wherein the tracking device uses radio frequency, electromagnetism and/or global positioning satellite technology.

* * * * *